(No Model.)
H. H. BARTLETT.
MACHINE FOR WINDING SILK.
No. 246,999. Patented Sept. 13, 1881.
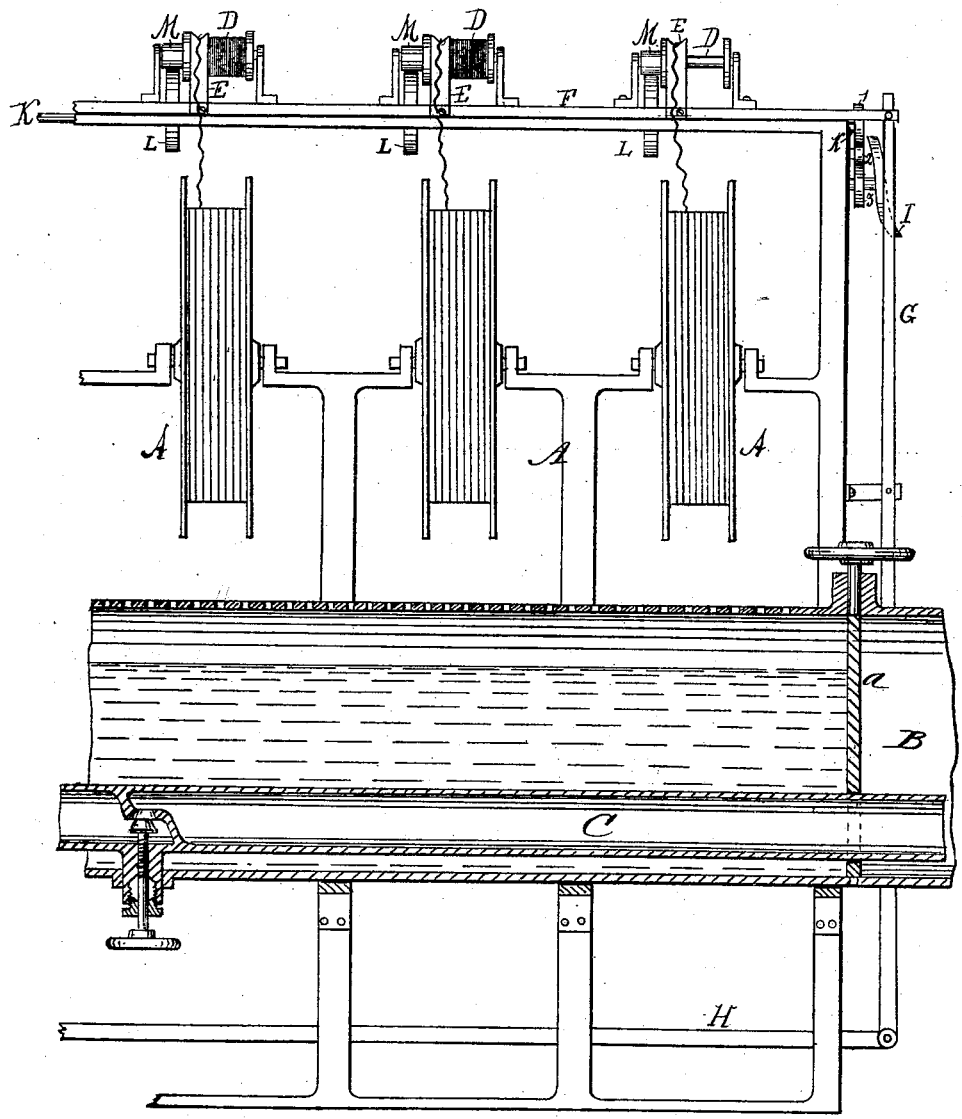
WITNESSES:
C. Neveux
C. Sedgwick
INVENTOR:
H. H. Bartlett
BY Munn & Co
ATTORNEYS.

UNITED STATES PATENT OFFICE.

HENRY H. BARTLETT, OF WATERTOWN, CONNECTICUT.

MACHINE FOR WINDING SILK.

SPECIFICATION forming part of Letters Patent No. 246,999, dated September 13, 1881.

Application filed September 13, 1880. (No model.)

*To all whom it may concern:*

Be it known that I, HENRY H. BARTLETT, of Watertown, in the county of Litchfield and State of Connecticut, have invented a new and useful Improvement in Machines for Winding Silk, of which the following is a specification.

The object of my invention is to soften raw silk and prevent generation of electricity in boiled silk during the process of winding.

The invention consists in providing the winding-machine with a steam-generator for dampening or moistening the silk by a spray of steam, whereby the gum on the raw silk is kept soft, and in the case of boiled silk it is rendered flexible while being wound, and the generation of electricity is prevented.

In the accompanying drawing apparatus is shown embodying my invention.

A A A are swifts, such as are used in silk-winding frames of usual character.

B is a pipe or tube fitted beneath the swifts A and connected with a suitable reservoir of water, so that the water shall be maintained in the tube up to the dotted line; or water will be supplied to the tube by opening a valve, *a*. The upper surface of pipe B is perforated, as shown. C is a pipe extending through pipe B. This pipe C is to be connected with a steam-generator for supplying live steam within pipe C to heat the water in pipe B. The steam generated in pipe B will pass out through the perforations and rise into contact with the silk on the swifts. D are the bobbins, two of which are represented full and one empty.

E are the guides, which are attached to the guide-bar F. The said guide-bar has lateral free movement, and is pivoted to bar G, whose other extremity is pivoted to bar H, the latter connecting it with a like bar at the other side of the frame, both of said bars being moved by cams actuated by the main shaft K through the train of wheels 1 2 3, and which give reciprocal movement to the guide-bar and guides, so that the silk is wound evenly upon the bobbins.

To the main shaft K are attached at intervals friction-wheels L, which engage with the friction-collars on bobbins M and cause the latter to revolve.

The effect of the entire operation is to soften the gum on raw silk, thereby rendering it soft and pliable, and to prevent generation of electricity in boiled silk, so that it can be wound with great facility.

What I claim is—

In silk-winding frames, the combination, with the swifts A, of a steam-generator, B, arranged below them and provided with perforations at the upper side, whereby the silk is dampened, as and for the purposes specified.

HENRY H. BARTLETT.

Witnesses:
H. J. MATTOON,
SILAS MARSHALL.